Patented Aug. 31, 1948

2,448,259

UNITED STATES PATENT OFFICE 2,448,259

UNSATURATED ESTERS OF SUBSTITUTED ADIPIC ACID AND THEIR PRODUCTION

Harry de V. Finch, El Cerrito, Calif., assignor to Shell Development Company, San Francisco, Calif., a corporation of Delaware No Drawing. Application October 16, 1944,
Serial No. 558,969

21 Claims. (Cl. 260—78.4)

This invention relates to unsaturated esters and to methods for their production. More particularly the invention pertains to the monomeric and polymeric unsaturated alcohol esters of the trimethyladipic acids wherein the methyl groups are substituted upon the alpha and gamma carbon atoms, and to methods for the production of such esters.

The unsaturated esters of the invention are valuable compounds which have many important uses. Since they have physical and chemical properties which are surprisingly different from the properties of the corresponding straight chain compounds, e. g. the unsaturated esters of adipic acid, they may be used in many applications for which the said straight chain compounds are not well suited. This difference in properties may be attributed to the unique atomic configuration which characterizes the esters of the invention. As is apparent, they contain an unsaturated group or groups attached through an ester linkage to a highly branched carbon chain which contains a quaternary carbon atom, i. e. a carbon atom which is linked through single valence bonds to four other carbon atoms. The compounds of the invention are therefore particularly valuable plasticizers and tackifiers for a wide variety of synthetic resins, being compatible with a large number of resinous materials and imparting valuable properties thereto. They are also useful textile assistants. Being highly toxic to insects, they are useful as insecticides or as components of insecticidal compositions. Because of the presence of two types of reactive groups, i. e. the olefinic group and the ester group, the esters of the invention are valuable intermediates in the synthesis of other organic compounds, thus offering an inexpensive source of a variety of compounds which contain a highly branched carbon chain. A particularly important use of the herein disclosed unsaturated esters resides, however, in their suitability for use as starting materials for the preparation of synthetic resins, particularly allyl-type resins. This application of the esters of the invention is more fully described hereinbelow. As stated, the novel unsaturated esters which are disclosed herein comprise the esters of the unsaturated alcohols and the trimethyladipic acids wherein the methyl groups are substituted upon the alpha and gamma carbon atoms. The said acids comprise alpha,alpha,-gamma-trimethyladipic acid and alpha,gamma,-gamma-trimethyladipic acid. These acids may be prepared in a variety of ways. They may be prepared especially conveniently and inexpensively, however, from dihydroisophorone, dihydroisophorol, or the isomeric trimethylcyclohexenes which may be produced by the dehydration of dihydroisophorol. These compounds may be oxidized in such a manner as to break a carbon-carbon bond in their cyclic structure, thereby effecting the rupture of a carbon-carbon bond in the cyclic structure of the starting material, and giving rise to the formation of at least one trimethyladipic acid. The structure of the trimethyladipic acid formed by the oxidative process is obviously dependent upon the manner in which the oxidizing agent attacks the cyclohexyl nucleus. Thus, in the case of the oxidation of dihydroisophorol, when the point of attack of the oxidizing agent is the bond between the carbon atom bearing the hydroxyl group and the carbon atom which is adjacent to the dimethyl-substituted carbon atom, the product is alpha-alpha,-gamma-trimethyladipic acid:

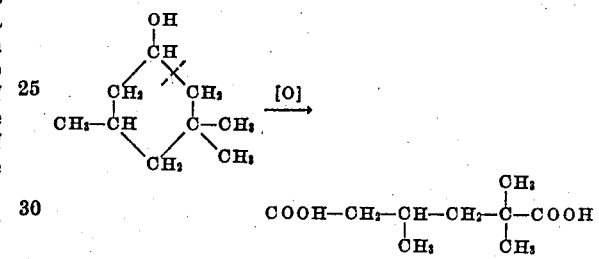

However, when the cleavage is in the opposite direction and the bond between the carbon atom bearing the hydroxyl group and the carbon atom adjacent to the monomethyl-substituted carbon atom is broken, the product is alpha,gamma,-gamma-trimethyladipic acid:

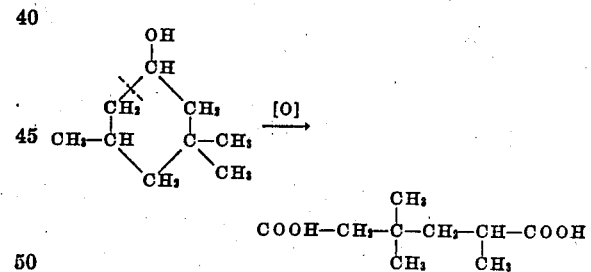

Both reactions usually occur when either dihydroisophorone or dihydroisophorol is treated with an oxidizing agent, with the result that a mixture of isomeric trimethyladipic acids is formed as a product. The relative amount of the isomers formed is variable and depends upon the particular oxidizing agent used and the operating conditions, such as the temperature, pressure, presence or absence of a catalyst, reaction time, etc. It has been found, however, that when the oxidation is effected using nitric acid in the manner described hereinbelow a reaction product is formed which comprises from about 60% to about 80% of alpha,alpha,gamma-trimethyladipic acid and from about 20% to about 40% of alpha,gamma,-gamma-trimethyladipic acid.

The oxidation of the dihydroisophorone, dihydroisophorol or the mixture of olefins obtainable by the dehydration of dihydroisophorol may be effected through the agency of a variety of oxidizing agents. Suitable oxidizing agents include, for example, potassium permanganate, potassium dichromate, nitric acid and the like. It may also be carried out catalytically in either the liquid or vapor phase, using oxygen or oxygen-containing gaseous mixtures, such as air, in the presence of a catalyst comprising compounds of cobalt, manganese, vanadium, nickel or chromium.

In a preferred method for oxidizing the hereinabove described compounds to trimethyladipic acid a quantity of dihydroisophorol may be heated at a temperature which is about the boiling temperature of the mixture with a molar excess of nitric acid having a concentration of about 50% nitric acid with or without the addition of a small amount of a catalyst such as ammonium vanadate, cobalt acetate or manganese acetate. When the reaction is complete the reaction product may be fractionally distilled to separate the mixture of trimethyladipic acids therefrom. In another preferred method trimethylcyclohexanone may be oxidized catalytically in the liquid phase by passing oxygen or an oxygen-containing gas through a solution of trimethylcyclohexanone and a catalyst comprising, for example, cobalt acetate or manganese acetate in a suitable solvent such as glacial acetic acid. During the reaction period the reaction mixture may be maintained at an elevated temperature, preferably a temperature of between about 90° C. and about 110° C. The reaction product may then be fractionally distilled, thereby separating the trimethyladipic acids from the other constituents of the reaction mixture, i. e. from the acetic acid solvent, unreacted ketone, and any higher acids or polymeric material which might be present. These acids may be used individually in the preparation of the unsaturated esters of the invention or they may be used as the mixture of isomers resulting from the hereinabove described oxidative process.

The unsaturated alcohols which may be used in the synthesis of the herein disclosed unsaturated trimethyladipic acid esters comprise any primary, secondary or tertiary alcohols which contain at least one unsaturated group, e. g. an olefinic group or an acetylenic group. The esters may be, for example, those corresponding to the hypothetical alcohols having a double bond of aliphatic character between two carbon atoms one of which is attached directly to an alcoholic hydroxyl group as represented by the general formula

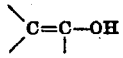

Of the alcohols of this type a preferred subgroup consists of compounds having a terminal methylene group attached directly by an olefinic double bond, to a carbinol carbon atom, as represented by the general formula $$CH_2=C-OH$$

Examples of preferred alcohols are vinyl alcohol, isopropenol, buten-1-ol-2, etc. Examples of other alcohols are propen-1-ol-1, buten-1-ol-1, cyclohexen-1-ol-1, cyclopenten-1-ol-1, etc. Vinyl alcohol is a preferred specific alpha-unsaturated alcohol.

Another type of unsaturated alcohols which may be esterified with the trimethyladipic acids to form a particularly useful class of unsaturated trimethyladipic acid esters comprises the unsaturated alcohols having an olefinic double bond of aliphatic character between two carbon atoms, one of which is attached directly to a saturated carbon atom which in turn is attached directly to an alcoholic hydroxyl group, as represented by the general structural formula

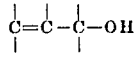

Preferred alcohols have a terminal methylene group attached directly by an olefinic double bond to a carbon atom which is attached directly to a saturated carbinol carbon atom, as represented by the formula

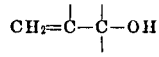

Representative examples of alcohols are the following terminally unsaturated aliphatic alcohols of 3 to 8 carbon atoms per molecule and aralkenyl alcohols of 9 to 13 carbon atoms per molecule: allyl alcohol, methallyl alcohol, ethallyl alcohol, chloroallyl alcohol, buten-1-ol-3, penten-1-ol-3, hexen-1-ol-3, 3-methyl-buten-1-ol-3, 3-methyl-penten-1-ol-3, 2-methyl-buten-1-ol-3, 2-methyl-penten-1-ol-3, 2,3-dimethyl-buten-1-ol-3, hepten-1-ol-3, 4-methyl-hexen-1-ol-3, 5-methyl-hexen-1-ol-3, 4,4'-dimethyl-penten-1-ol-3, octen-1-ol-3, 6-methyl-hepten-1-ol-3, 4-methyl-hepten-1-ol-3, 4,4'-dimethyl-hexen-1-ol-3, 3-phenyl-propen-1-ol-3, 3-tolyl-propen-1-ol-3, 3-xylyl-propen-1-ol-3, 4-phenyl-buten-1-ol-3, 4-tolyl-buten-1-ol-3, 4-xylyl-buten-1-ol-3, 3-naphthyl-propen-1-ol-3, 4-chloro-buten-1-ol-3, pentadien-1,4-ol-3, hexen-1-yn-5-ol-3, 2-methyl-penten-1-yn-4-ol-3, and 2,5-dimethyl-hexadien-1,5-ol-4. Other alcohols are crotyl alcohol, tiglyl alcohol, 3-chloro-buten-2-ol-1, cinnamyl alcohol, hexadien-2,4-ol-1, hexadien-2,5-ol-1, butadien-2,3-ol-1, hexadien-3,5-ol-2, 2-methyl-hexen-2-ol-1, 2-methyl-penten-2-ol-1, 3,7-dimethyl-octadien-2,7-ol-1, cyclopenten-2-ol-1, cyclohexen-2-ol-1, etc.

The acetylenic alcohols, i. e. compounds which contain a triple bond, comprise a third class of alcohols which may be reacted with the trimethyladipic acids to form useful unsaturated trimethyladipic acid esters. Representative acetylenic alcohols are propargyl alcohol, pentyn-3-ol-2, 2-methylhexyn-3-ol-2, 3,7-dimethyl-octyn-1-en-6-ol-3, etc. Other alcohols are:

Buten-1-ol-4 (allyl carbinol)
Penten-1-ol-5
2,6-dimethyl-octen-1-ol-8
2,6-dimethyl-octen-2-ol-8
Hydrosorbyl alcohol
Isohydrosorbyl alcohol
Undecylenyl alcohol
Dodecylenyl alcohol
Oleyl alcohol
Isooleyl alcohol Vinyl allyl alcohol
Sorbyl alcohol
Geranyl alcohol
Linoleyl alcohol
Linolenyl alcohol
Cyclopentenyl alcohol
Cyclohexenyl alcohol
Cyclohexenyl carbinol, etc.

These and other unsaturated alcohols may be reacted with the trimethyladipic acids, using a single species of alcohol to prepare a single species of trimethyladipic acid ester or, if desired, a variety of different species of alcohols in admixture with each other to produce a variety of species of unsaturated trimethyladipic esters. The unsaturated alcohols may also be used in the form of their ester-forming derivatives, e. g. in the form of the alkali metal alkoxides, e. g. sodium alloxide.

Representative examples of the unsaturated trimethyladipic acid esters of the invention are:

Monovinyl-alpha,gamma,gamma-trimethyl adipate
Divinyl-alpha,alpha,gamma-trimethyl adipate
Divinyl-alpha,gamma,gamma-trimethyl adipate
Monoisopropenyl-alpha,alpha,gamma-trimethyl adipate
Monoisopropenyl-alpha,gamma,gamma-trimethyl adipate
Diisopropenyl-alpha,alpha,gamma-trimethyl adipate
Diisopropenyl-alpha,gamma,gamma-trimethyl adipate
Monopropargyl-alpha-alpha,gamma-trimethyl adipate
Monopropargyl-alpha,gamma,gamma-trimethyl adipate
Dipropargyl-alpha,alpha,gamma-trimethyl adipate
Dipropargyl-alpha,gamma,gamma-trimethyl adipate
Monoallyl-alpha,alpha,gamma-trimethyl adipate
Monoallyl-alpha,gamma,gamma-trimethyl adipate
Diallyl-alpha,alpha,gamma-trimethyl adipate
Diallyl-alpha,gamma,gamma-trimethyl adipate
Monomethallyl-alpha,alpha,gamma-trimethyl adipate
Monomethallyl-alpha,gamma,gamma-trimethyl adipate
Dimethallyl-alpha,alpha,gamma-trimethyl adipate
Dimethallyl-alpha,gamma,gamma-trimethyl adipate
Monooleyl-alpha,alpha,gamma-trimethyl adipate
Monooleyl-alpha,gamma,gamma-trimethyl adipate
Dioleyl-alpha,alpha,gamma-trimethyl adipate
Dioleyl-alpha,gamma,gamma-trimethyl adipate
Methyl vinyl-alpha,alpha,gamma-trimethyl adipate
Methyl isopropenyl-alpha,alpha,gamma-trimethyl adipate
Methyl propargyl-alpha,alpha,gamma-trimethyl adipate
Allyl methyl-alpha,alpha,gamma-trimethyl adipate
Methyl clclohexenyl-alpha,alpha,gamma-trimethyl adipate
Vinyl allyl-alpha,alpha,gamma-trimethyl adipate
Isopropenyl methallyl - alpha,alpha,gamma - trimethyl adipate
Methyl vinyl-alpha,gamma,gamma-trimethyl adipate
Methyl isopropenyl-alpha,gamma,gamma-trimethyl adipate
Methyl propargyl-alpha,gamma,gamma-trimethyl adipate
Allyl methyl-alpha,gamma,gamma-trimethyl adipate
Methyl cyclohexenyl-alpha,gamma,gamma,trimethyl adipate
Vinyl allyl-alpha,gamma,gamma-trimethyl adipate
Isopropenyl methallyl-alpha,gamma,gamma-trimethyl adipate, etc.

Most of the methods which are customarily applied to the production of unsaturated esters may be satisfactorily applied to the synthesis of the unsaturated trimethyladipic acid esters of the invention. These esters may be prepared, for example, by reacting a trimethyladipyl chloride with an unsaturated alcohol or with an unsaturated alkali metal alkoxide, e. g. sodium alloxide. Alternatively, the unsaturated esters of the invention may be synthesized by reacting a trimethyladipic anhydride with an unsaturated alcohol. Where the unsaturated alcohols are unstable, the corresponding esters may often be prepared by a simple ester exchange reaction, as by reacting a trimethyl adipic acid with an unsaturated ester of a fatty acid, e. g. isopropenyl acetate. Where the unsaturated alcohols are stable, however, the unsaturated esters of the invention may usually be most satisfactorily prepared by direct esterification of the trimethyladipic acid or the mixture of isomeric trimethyladipic acids with the unsaturated alcohol in the presence of a suitable esterification catalyst. This reaction is in most cases carried out more satisfactorily when provision is made for removing the water which is a product of the esterification reaction substantially as soon as it is formed. The water may be removed by any suitable method. One method comprises effecting the reaction at the boiling temperature of the reactants in a still equipped with a dehydrating head. The dehydration may be carried out more easily in many cases if an entraining agent for water is added to the reaction mixture. Benzene, toluene, and the like are suitable entraining agents to be used for this purpose. Esterification catalysts which may be used to promote the reaction preferably comprise acidic substances such as the mineral acids, e. g. sulfuric acid, hydrochloric acid, phosphoric acid and the like. Certain of the organic acids may also be used, suitable organic acids being, for example, benzene sulfonic acids and para-toluene sulfonic acid. These may be added to the reaction mixture in any effective amount. It is usually sufficient to add up to about 1% by weight, based on the amount of trimethyladipic acid used.

The esterification reaction may be carried out at any temperature which is sufficiently high to cause the desired reaction to take place. As stated, temperatures which are about the boiling or reflux temperatures of the reaction mixture are usually preferred. Higher or lower temperatures may be used in a given case, however, if necessary.

The reaction is usually satisfactorily carried out at atmospheric pressure. However, superatmospheric or subatmospheric pressures may be employed if desired.

Any suitable type of apparatus may be used. As pointed out, however, it is often desirable to use apparatus which is equipped with phase-separating means as, for example, a separatory still head.

The relative amounts of the reacting substances are variable depending largely upon whether it is desired to prepare the mono-ester or the di-ester. When the mono-ester is to be prepared, the reactants are preferably used in the ratio of about one mole of unsaturated alcohol per mole of trimethyladipic acid. However, when it is desired to prepare the di-ester, at least two moles of alcohol are used for each mole of trimethyladipic acid. Use of a greater amount of alcohol may be desirable in certain cases as where it is desired to complete the reaction in a relatively short reaction time and to secure relatively high conversions of trimethyladipic acid to ester.

One embodiment of the invention is represented by the following:

Divinyltrimethyl adipate may be prepared by heating a mixture comprising the herein described mixture of isomeric trimethyladipic acids and vinyl acetate, preferably using an excess of the latter component. The reaction is best carried out in the presence of a catalyst such as mercuric sulfate which may be introduced as such, or prepared in situ, as by the reaction between sulfuric acid and mercuric acetate. The reaction mixture may be heated at reflux temperature until equilibrium is reached. The mixture may then be flash distilled to remove the excess vinyl acetate as well as the acetic acid formed by acid exchange as a product of the reaction, thereby leaving as a residue the divinyltrimethyl adipate. This product may be purified by any suitable means, as by distillation under diminished pressure, preferably in the presence of a polymerization inhibitor such as tannic acid.

Another embodiment is represented by the procedure which may be used to prepare diallyltrimethyl adipate from dihydroisophorol. This procedure makes use of a mixture of alpha,alpha,-gamma-trimethyladipic acid and alpha,gamma,-gamma-trimethyladipic acid and leads to the formation of a mixture of the corresponding di-allyl esters. In accordance with this embodiment, dihydroisphorol or an equivalent substance such as dihydroisophorone or the isomeric trimethylcyclohexenes which may be formed by the dehydration of dihydroisophorol is converted to the aforesaid mixture of isomeric trimethyl adipic acids by reaction with a suitable oxidizing agent. Although a variety of different oxidizing agents may be used for this purpose, an aqueous solution of nitric acid, e. g. a 50% aqueous solution, is preferred. When a 50% aqueous solution of nitric acid is used as the oxidizing agent, the oxidation may be satisfactorily effected at a temperature which is about the boiling temperature of the reaction mixture. When the reaction is complete, the reaction mixture is fractionally distilled or otherwise treated to separate the mixture of isomeric trimethyladipic acids.

The mixture of trimethyladipic acids prepared as described above may then be used without further treatment in the production of a mixture of isomeric unsaturated esters, e. g. the diallyl esters. This esterification reaction may be carried out by heating a mixture of the aforesaid trimethyladipic acids, allyl alcohol, and an acid esterification catalyst, preferably para-toluene sulfonic acid. The trimethyladipic acids and the allyl alcohol are preferably used in a ratio which is such as to furnish at least two moles of allyl alcohol for each mole of trimethyladipic acid. Benzene is preferably added to the reaction mixture as a water-entraining agent and the reaction is preferably carried out at about the boiling temperature of the reaction mixture, water being separated therefrom substantially as soon as it is formed. When the reaction is complete the reaction mixture is distilled to separate the diallyltrimethyl adipates.

As pointed out hereinabove, the allyl-type esters of the trimethyladipic acids are particularly valuable substances since they may be used as starting materials for the production of allyl-type resins. These resins are thus produced comparatively inexpensively and are hard, clear, resinous substances which are readily adaptable to fabrication into a variety of useful products. A single allyl-type ester of a trimethyladipic acid may be polymerized alone to form a useful resin or two or more esters may be polymerized in admixture with one another.

The esters can also be polymerized in the presence of other polymerizable compounds containing one or more unsaturated carbon-to-carbon linkages. Typical co-polymerizable compounds are those containing in the molecule a single polymerizable olefinic linkage

such as styrene, vinyl halides, vinylidene halides, vinyl esters of saturated monocarboxylic acids, methyl acrylate, methyl methacrylate, allyl halides, allyl esters of saturated monocarboxylic acids, etc. Another important group consists of unconjugated polymerizable compounds having in the molecule two or more non-conjugated polymerizable unsaturated linkages such as unsaturated aliphatic polyesters of saturated polybasic acids, polyesters of saturated polyhydric alcohols with unsaturated organic acids, and esters of unsaturated alcohols with unsaturated aliphatic acids. Other polymerizable unsaturated compounds are those containing in the molecule one or more polymerizable organic radicals and one or more inorganic radicals or elements as exemplified by the vinyl, allyl and methallyl esters of phosphoric acid and of the ortho acids of silicon, boron, etc. Another important group of co-polymerizable compounds consists of those having in the molecule two or more, preferably two, conjugated unsaturated polymerizable carbon-to-carbon linkages such as conjugated butadiene, conjugated chlorobutadiene, isoprene, the other conjugated pentadienes, the conjugated hexadienes, their homologues, analogues and suitable substitution products. Particularly valuable co-polymers are those of the compounds of the invention with one or more allyl-type polyesters of polycarboxylic acids, particularly allyl-type polyesters of aromatic polycarboxylic acids, e. g. diallyl phthalate and the like. Other valuable co-polymers of the preferred class are those with allyl-type polyesters of ethereal oxygen-containing polycarboxlic acids, e. g. diallyl diglycolate.

The compounds of the invention can be polymerized and co-polymerized by oxygen-containing polymerization catalysts. Benzoyl peroxide has been found satisfactory for this purpose. Other polymerization catalysts are acetyl peroxide, benzoyl acetyl peroxide, lauryl peroxide, dibutyryl peroxide, succinyl peroxide, sodium peroxide, barium peroxide, tertiary alkyl hydroperoxides, such as tertiary butyl hydroperoxide, peracetic acid, perphthalic acid, sodium peroxide, perborates, persulfates, ozone and oxygen. The compounds can be polymerized in the presence of their own peroxides, or of their ozonides. Another class of polymerization catalysts consists of the di(tertiary alkyl) peroxides, notably di(tertiary butyl) peroxide, as described and claimed in the co-pending application of Vaughan and Rust, Serial Number 481,052, filed March 29, 1943, now U. S. Patent 2,426,476, which is a continuation-in-part of their co-pending application Serial Number 474,224, filed January 30, 1943, now U. S. Patent 2,395,523. Metals and metallic salts may be used as polymerization catalysts. If desired, mixtures of polymerization catalysts can be used, a suitable mixture being that of benzoyl peroxide and hydrogen peroxide. In some cases it may be desirable to conduct the polymerization in the concurrent presence of both a catalyst and an inhibitor of polymerization. The amount of peroxide catalyst used will ordinarily be between about 0.01% and about 5%, although it is not necessarily limited to this range. In still other cases it may be unnecessary to use any catalyst at all.

Polymerization is usually energized by the application of heat, although both heat and light may be used, and in some cases, light may be sufficient. Temperatures between about 60° C. and about 150° C. are preferred, although higher and lower temperatures can be used. The monomeric compounds can be polymerized in the massive state or as dispersions or solutions. Where the dispersion method is employed, it may be desirable to select a dispersing medium insoluble in the catalyst involved. With certain compounds polymerization can be effected in vapor state. Continuous or discontinuous processes may be used. Atmospheric, reduced, or superatmosperic pressures may be used. Polymerization may be carried out under a blanket of an inert gas.

The polymerization reaction can be carried to completion without substantial interruption or it can be stopped at any point short of completion. Incomplete polymerization may be used for the production of a syrup comprising a mixture of monomer and polymer which may be further worked and eventually substantially completely polymerized. The syrup may, for instance, be transferred to a mold of any desired configuration and again subjected to polymerization conditions, or it may be used in coating operations, or in impregnating bibulous, e. g. fibrous, material, which in turn may be used in the production of laminates. Unreacted monomer may be separated from its mixture with polymer by solvent extraction, distillation or other methods. The separated polymer may then be worked up in any known or special manner. In the case of many compounds, particularly in the case of the polymerization of compounds having two or more non-conjugated polymerizable unsaturated linkages in the molecule, the separated polymer may be capable of further polymerization. Such compounds can be rendered infusible and insoluble in common nonreactive solvents.

Polymers and co-polymers of the invention can be modified by admixture with other synthetic resins, natural resins, cellulose derivatives, and drying oils. Preferred modifiers are film-forming substances. Examples of synthetic resins in addition to polymers of the polymerizable unsaturated organic compounds illustrated hereinabove are alkyd resins, urea-aldehyde resins, phenol-aldehyde resins and synthetic linear super-polyamides and polyester-amides. There may also be present one or more plasticizers, stabilizers, lubricants, dyes, pigments, or fillers. Where the modifiers do not react with, or otherwise adversely affect, the ingredients of the reaction mixture, they may be added to the monomer or to the partially polymerized material. Where the modifiers are not added to the monomer, they can be incorporated with preformed polymer by grinding, mixing or milling on heated rolls, or by co-precipitation from a common solvent.

Polymers and co-polymers can be produced in accordance with the invention which are characterized by excellent resistance to the action of physical and chemical agents. Resins can be produced which are clear, water-white, hard and infusible. Many of the polymers possess film-forming properties and adhere well to metal and to many other kinds of surfaces. They can be used as the basis for valuable coating compositions. Some of the solid resinous products of the invention can be used as glass substitutes. Massive castings can be subjected to machine operations. Many of the resins can be used in extrusion, injection molding and compression molding processes.

The process of the invention for the production of unsaturated esters of the trimethyladipic acids wherein the methyl groups are substituted upon the alpha and gamma carbon atoms is illustrated by the following examples wherein the parts are parts by weight.

*Example I*

Monoallyl - alpha,alpha,gamma - trimethyladipate was prepared by heating at reflux temperature in an apparatus equipped with a fractionating column having a phase separating head a mixture comprising alpha,alpha,gamma - trimethyladipic acid and allyl alcohol in the ratio of about 1 mole of trimethyladipic acid to 1 mole of allyl alcohol, together with a small amount of para-toluene sulfonic acid and a sufficient amount of benzene to serve as a carrier for the water product. The water layer was removed from the phase separating head substantially as soon as it was formed. Completion of the reaction was indicated by the cessation of water formation. The reaction mixture was distilled, thereby separating the desired monoallyl ester from the other constituents of the reaction mixture. The monoallyl ester product had a boiling point of 122° C.–128° C. at 0.5 mm. It had an acidity (eq./100 gr.) of 0.402, a bromine number (gr./100 gr.) of 73 and a saponification value (eq./100 gr.) of 0.864. It analyzed 8.8% H and 63.3% C (theory, 8.8% H and 63.2% C).

*Example II*

Allylvinyltrimethyl adipate is prepared by forming a mixture of allylhydrogen adipate, vinyl acetate, mercuric acetate and sulfuric acid. This mixture is refluxed for about one hour, following which it is distilled at atmospheric pressure until the vinyl acetate and acetic acid have been removed. The residue is then distilled at subatmospheric pressure, preferably in the presence of tannic acid, in order to separate the allylvinyltrimethyl adipate.

*Example III*

A mixture of dimethallyl-alpha,alpha,gamma-trimethyl adipate and dimethallyl - alpha,-gamma,gamma-trimethyl adipate is prepared by reacting a mixture of alpha,alpha,gamma-trimethyladipic acid and alpha,gamma,gamma-trimethyladipic acid with a molar excess of methallyl alcohol, using a phosphoric acid catalyst. The reaction is carried out substantially as described for the preparation of isopropenyl-apha,-gamma,gamma-trimethyl adipate in Example II.

Example IV

Propargyl trimethyl adipate is prepared from propargyl alcohol and trimethyladipic acid, using the procedure described in Example I.

Example V

A mixture of diallyl-alpha,alpha,gamma-trimethyl adipate and diallyl-alpha,gamma,gamma-trimethyl adipate was prepared from dihydroisophorol or from its equivalents dihydroisophorone or the mixture of isomeric trimethylcyclohexenes formed by the dehydration of dihydroisophorol. This preparation was accomplished by adding a quantity of dihydroisophorol, or of its equivalents, to a quantity of 50% nitric acid contained in a suitable reaction vessel.

The dihydroisophorol was added at such a rate as to effect a smooth reaction and maintain the temperature of the reaction mixture at about the boiling temperature. The reaction mixture was preferably stirred during the addition of the dihydroisophorol. When the reaction was complete the reaction mixture was fractionally distilled, thereby separating the trimethyladipic acid product from the excess nitric acid, water and other by-products. The trimethyladipic acid fraction boiled at 170° C. to 180° C. at 3 mm. Upon standing it crystallized to form a solid product melting between 45° C. and 55° C. The equivalent weight of the acid fraction was determined to be 98.5 (theory, 94).

The composition of the mixture of isomeric trimethyladipic acids obtained in this manner was determined by converting the mixture to a mixture of trimethylcyclopentanones, which mixture could be separated by fractional distillation. The cyclopentanones were prepared by heating about 1 part by weight of barium hydroxide octahydrate with about 15 parts of the trimethyladipic acid mixture at 200° C. to 285° C. The organic product was fractionally distilled, thereby effecting its separation into two products which were identified as 2,4,4-trimethylcyclopentanone and 3,5,5-trimethylcyclopentanone. The relative amounts of these two derivatives were such as to indicate that the original mixture of isomeric trimethyladipic acids from which the cyclopentanones were formed comprised from about 60% to about 80% of alpha, alpha, gamma-trimethyladipic acid and from about 20% to about 40% of alpha,gamma,gamma-trimethyladipic acid. The mixture of isomeric trimethyladipic acids obtained in this manner was converted to a mixture of the corresponding diallyl esters by reaction with allyl alcohol, using at least two moles of allyl alcohol for each mole of trimethyladipic acid. The procedure used was otherwise substantially the same as that employed for the preparation of monoallyltrimethyl adipate as described in Example I. Distillation of the reaction product resulted in the separation of the desired diallyl esters, which boiled at 100° C. to 105° C. at 1 mm. and had a saponification value (eq./100 gr.) of 0.750, and a bromine number (gr./100 gr.) of 118. The mixture of esters analyzed 66.8% C and 9.0% H, the theoretical analysis being 67.2% C and 8.95% H.

Example VI

The diallyltrimethyladipic acid esters obtained substantially as described in Example V were polymerized by forming a mixture comprising the said esters together with about 5% by weight of benzoyl peroxide. The said mixture was heated at about 65° C. for from 5 to 20 hours. The polymeric product was an infusible solid which was light yellow in color.

Example VII

The diallyltrimethyladipic acid esters obtained as described in Example V were polymerized using substantially the same procedure as described in Example VI with the exception that only about 2% by weight of benzoyl peroxide catalyst was used. In this case the mixture had set to a gel after having been heated at 65° C. for about 5 hours. After about 6 days a light yellow clear infusible polymer was obtained.

I claim as my invention:

1. A polymerizable ester of an alcohol having an aliphatic multiple linkage between two carbon atoms and trimethyladipic acid wherein the methyl groups are substituted upon the alpha and gamma carbon atoms.

2. A polymer of a polymerizable ester of an aliphatic alcohol having a multiple linkage between two carbon atoms and trimethyladipic acid wherein the methyl groups are substituted upon the alpha and gamma carbon atoms.

3. A polymerizable ester of an aliphatic monohydric alcohol of 3 to 8 carbon atoms per molecule having an olefinic linkage between two carbon atoms, one of which is a terminal carbon atom, and trimethyladipic acid wherein the methyl groups are substituted upon the alpha and gamma carbon atoms.

4. An ester of an unsaturated alcohol having an aliphatic multiple linkage between two carbon atoms and alpha,alpha,gamma-trimethyladipic acid.

5. An ester of an unsaturated alcohol having an aliphatic multiple linkage between two carbon atoms and alpha,gamma,gamma-trimethyladipic acid.

6. An ester of a vinyl alcohol and trimethyladipic acid wherein the methyl groups are substituted upon the alpha and gamma carbon atoms.

7. A monoester of an allyl alcohol and trimethyladipic acid wherein the methyl groups are substituted upon the alpha and gamma carbon atoms.

8. Monoallyl-alpha,alpha,gamma - trimethyl adipate.

9. A mixture of isomeric monoallyl esters which comprises from about 60% and about 80% of monoallyl-alpha,alpha,gamma-trimethyl adipate and between about 20% and about 40% monoallyl - alpha,gamma,gamma-trimethyl adipate.

10. A diallyl ester of trimethyladipic acid wherein the methyl groups are substituted upon the alpha and gamma carbon atoms.

11. A polymeric diallyl ester of trimethyladipic acid wherein the methyl groups are substituted upon the alpha and gamma carbon atoms.

12. A diester of a mono-olefinic monohydric aliphatic hydrocarbon alcohol of 3 to 8 carbon atoms per molecule having a terminal methylene group attached by the olefinic double bond to a carbon atom which is directly attached to the carbinol carbon atom and trimethyladipic acid wherein the methyl groups are substituted upon the alpha and gamma carbon atoms.

13. Diallyl - alpha,gamma,gamma-trimethyl adipate.

14. A mixture of isomeric diallyl trimethyl adipates which comprises from about 60% to about 80% of diallyl-alpha,alpha,gamma-trimethyl adipate and from about 20% to about 40% of diallyl-alpha,gamma,gamma-trimethyl adipate.

15. A process for the production of unsaturated esters which comprises heating a mixture of an unsaturated alcohol having an aliphatic multiple linkage between two carbon atoms and trimethyladipic acid wherein the methyl groups are substituted upon the alpha and gamma carbon atoms, in the presence of an acid esterification catalyst at the boiling temperature of the reaction mixture, and removing the water produced.

16. A process for the production of an ester of alpha,alpha,gamma-trimethyladipic acid and an unsaturated alcohol having an aliphatic multiple linkage between two carbon atoms, one of which is a terminal carbon atom, which comprises heating a mixture of an unsaturated alcohol and alpha,alpha,gamma-trimethyladipic acid, in the presence of an acid esterification catalyst at the boiling temperature of the reaction mixture, and removing the water produced.

17. A process for the production of esters which comprises heating a mixture of alpha,-gamma,gamma-trimethyladipic acid and an aliphatic unsaturated alcohol having an olefinic linkage between two carbon atoms, one of which is a terminal carbon atom, in the presence of an acid esterification catalyst at the boiling temperature of the reaction mixture, and removing the water produced.

18. A method for the preparation of a monoallyl ester of trimethyladipic acid wherein the methyl groups are substituted upon the alpha and gamma carbon atoms which comprises heating a mixture of allyl alcohol and a trimethyladipic acid wherein the methyl groups are substituted upon the alpha and gamma carbon atoms using the reactants in the relative amounts of about 1 mole of trimethyladipic acid to about 1 mole of allyl alcohol, in the presence of an acid esterification catalyst at the boiling temperature of the reaction mixture, and removing the water produced.

19. A method for the preparation of a diallyl ester of trimethyladipic acid wherein the methyl groups are substituted upon the alpha and gamma carbon atoms which comprises heating a mixture of allyl alcohol and a trimethyladipic acid wherein the methyl groups are substituted upon the alpha and gamma carbon atoms using the reactants in the relative amounts of one mole of trimethyladipic acid to about 2 moles of allyl alcohol, in the presence of an acid esterification catalyst at the boiling temperature of the reaction mixture, and removing the water produced.

20. A process for the production of polymers of allyl esters which comprises heating a mixture of allyl alcohol and trimethyladipic acid wherein the methyl groups are substituted upon the alpha and gamma carbon atoms in the presence of an acid esterification catalyst at the boiling temperature of the reaction mixture, removing the water produced and polymerizing the resulting allyl ester.

21. A process for the production of diallyltrimethyl adipates which comprises reacting a mixture of trimethyadipic acids which comprises from about 60% to about 80% alpha,alpha,-gamma-trimethyladipic acid and from about 20% to about 40% alpha,gamma,gamma-trimethyladipic acid, with allyl alcohol using a reaction mixture which contains about 1 mole of the said mixture of isomeric trimethyladipic acids to at least 2 moles of allyl alcohol together with an acid esterification catalyst, heating the said reaction mixture at a temperature which is substantially its boiling temperature, separating the water which is formed as a product of the reaction substantially as soon as it is formed, and fractionally distilling the dehydrated reaction mixture, thereby forming a product which essentially comprises from about 60% to about 80% of diallyl-alpha,alpha,gamma-trimethyl adipate and from about 20% to about 40% of alpha,-gamma,gamma-trimethyladipic acid.

HARRY DE V. FINCH.

REFERENCES CITED

The following references are of record in the file of this patent:

UNITED STATES PATENTS

| Number | Name | Date |
| --- | --- | --- |
| 1,643,619 | Claasen | Sept. 27, 1927 |
| 2,159,008 | Coleman et al. | May 23, 1939 |
| 2,218,439 | Rothrock | Oct. 15, 1940 |
| 2,238,030 | Bradley | Apr. 15, 1941 |
| 2,311,327 | Bradley | Feb. 16, 1943 |

OTHER REFERENCES

Qudrat-i-Khuda et al.: Abstract in Chem. Abstracts, 34, 993 (1940).

Beilstein, Handbuch der organischen Chemie, vol. 2, page 715.